United States Patent
Kwon et al.

(10) Patent No.: US 8,626,182 B2
(45) Date of Patent: Jan. 7, 2014

(54) COMMUNICATION SYSTEM AND METHOD FOR CONTROLLING INTERFERENCE CAUSED BY DIFFERENT KINDS OF BASE STATIONS

(75) Inventors: Il Won Kwon, Ansan-si (KR); Sang Min Lee, Seoul (KR); Yung Soo Kim, Seongnam-si (KR); Mi Sun Do, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 775 days.

(21) Appl. No.: 12/711,898

(22) Filed: Feb. 24, 2010

(65) Prior Publication Data

US 2010/0216486 A1     Aug. 26, 2010

(30) Foreign Application Priority Data

Feb. 24, 2009    (KR) ........................ 10-2009-0015153

(51) Int. Cl.
    *H04W 72/06*     (2009.01)
(52) U.S. Cl.
    USPC ........ 455/452.2; 455/444; 455/450; 370/329; 370/252
(58) Field of Classification Search
    USPC .......... 370/352, 331, 332; 455/444, 425, 63.1
    See application file for complete search history.

(56) References Cited

U.S. PATENT DOCUMENTS

| | | | | |
|---|---|---|---|---|
| 7,747,221 | B2* | 6/2010 | Lee ............................... | 455/63.1 |
| 7,855,977 | B2* | 12/2010 | Morrison et al. ............. | 370/252 |
| 2007/0097939 | A1 | 5/2007 | Nylander et al. | |
| 2007/0183427 | A1 | 8/2007 | Nylander et al. | |
| 2008/0268833 | A1* | 10/2008 | Huang et al. ................... | 455/425 |
| 2009/0046665 | A1* | 2/2009 | Robson et al. ................ | 370/332 |
| 2009/0092096 | A1* | 4/2009 | Czaja et al. ................... | 370/331 |
| 2010/0120438 | A1* | 5/2010 | Kone et al. .................... | 455/444 |
| 2011/0116481 | A1* | 5/2011 | Wang ............................. | 370/336 |

* cited by examiner

*Primary Examiner* — Kashif Siddiqui
(74) *Attorney, Agent, or Firm* — The Farrell Law Firm, P.C.

(57) ABSTRACT

A communication system is provided which includes different kinds of base stations such as a macro base station and a femto base station. This system may execute a method for controlling unfavorably occurring interference due to such different kinds of base stations. In the method, the femto base station sends a femtocell interference indication (FII) report to the resource allocation control unit when user equipment is connected to the femto base station. The FII report contains a request for the allocation of resources to avoid interference. Then the resource allocation control unit establishes a femto interference coordination (FIC) zone according to the received FII report. The FIC zone indicates a particular region used to define resources allocated to the femto base station. The resource allocation control unit may be the macro base station or a self-organizing network (SON) server.

12 Claims, 8 Drawing Sheets

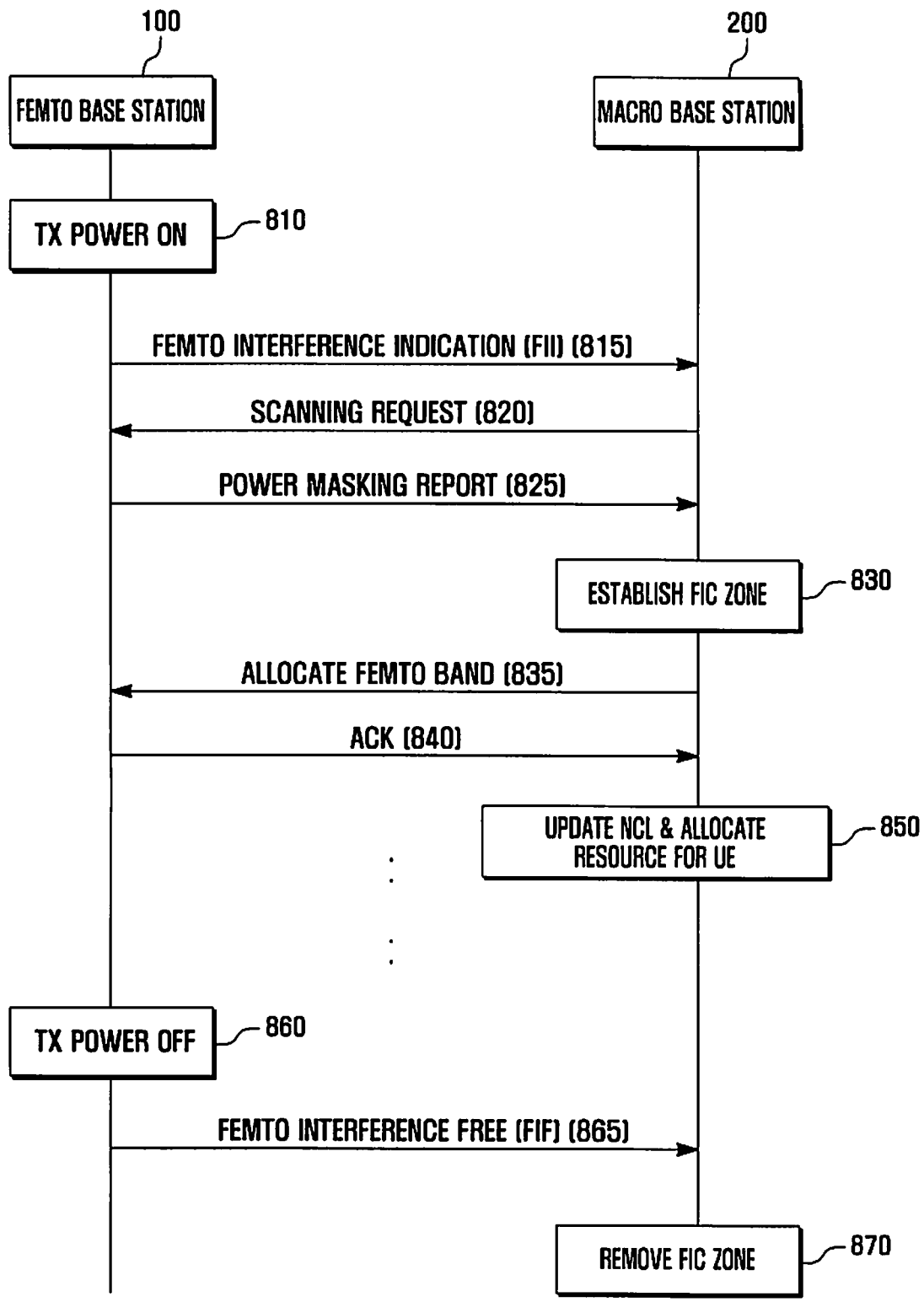

COMMUNICATION SYSTEM AND METHOD FOR CONTROLLING INTERFERENCE CAUSED BY DIFFERENT KINDS OF BASE STATIONS

PRIORITY

This application claims priority under 35 U.S.C. §119(a) to a Korean Patent Application filed in the Korean Intellectual Property Office on Feb. 24, 2009 and assigned Serial No. 10-2009-0015153, the entire contents of which are incorporated herein by reference.

BACKGROUND OF THE INVENTION

1. Field of the Invention

The present invention relates, in general, to mobile communication technology and, more particularly, to a communication system composed of different kinds of base stations such as a macro base station and a femto base station and a method for controlling unfavorable interference, occurring due to the different kinds of base stations.

2. Description of the Related Art

Normally a femtocell refers to a small cell that covers a very small range in a cellular system. A small cellular base station for controlling such femtocells is referred to as a femto base station or Home Node B (HNB). Such a femto base station is designed as a base station for use in residential or small business environments. Since a femtocell generally operates in an environment where a macro cell is also operating, unfavorable interference may often occur depending on the location of user equipment such as a mobile communication device, e.g., a cellular telephone. An example is shown in FIG. 1.

FIG. 1 is a schematic view illustrating a conventional communication environment in which interference occurs between a macro base station and a femto base station.

Referring to FIG. 1, the first femtocell A controlled by the first femto base station 100a (also referred to as HNB A) and the second femtocell B controlled by the second femto base station 100b (also referred to as HNB B) are located between the first macrocell A controlled by the first macro base station 200a and the second macrocell B controlled by the second macro base station 200b.

Additionally, certain user equipment 300a (also shown as UE macro) is located in the first macro cell. In the first femtocell A, certain user equipment 300b (also shown as UE A1) is located near the first macro cell, and another user equipment 300c (also shown as UE A2) is located near the first femto base station 100a. Also, user equipment 300d (also shown as UE B1) is located in the second femtocell, and user equipment 300f (also shown as UE macro) is located near the second femtocell in the second macro cell.

In FIG. 1, dotted lines indicate a downlink of data transmission from a base station to user equipment, and solid lines indicate an uplink of data transmission from user equipment to a base station.

A certain uplink between the first macro base station 200a and user equipment 300a may be affected by interference with another uplink, indicated by number 1, between the first macro base station 200a and user equipment 300b. Furthermore, a certain downlink between the second macro base station 200b and user equipment 300f may be affected by interference with another downlink, indicated by number 2, between the second femto base station 100b and user equipment 300f.

In order to control such interference between a macro base station and a femto base station, various methods have been studied in the art. For instance, widely used methods of controlling such interference are a power control method which regulates the transmission power (also referred to as Tx power) of a femto base station, an adaptive Tx on/off method which turns on the transmission power of a femto base station when the user equipment approaches a femtocell, and a radio resource management (RRM) method in an Orthogonal Frequency Division Multiplexing (OFDM) system.

Among them, an adaptive Tx on/off method is implemented as follows. A femto base station is composed of a transmission terminal for transmitting data and a reception terminal for receiving data. A femto base station monitors the reception signal strength from user equipment while turning off the power of a transmission terminal and turning on the power of a reception terminal. When a user equipment approaches a femtocell, a femto base station checks the reception signal strength of the approaching user equipment at a reception terminal. If the signal strength is more than a threshold value, the femto base station turns on the power of the transmission terminal in order to reduce interference.

Meanwhile, an RRM-based method controls interference by appropriately allocating resources to a femto base station and a macro base station. In this case, resources of the femto base station and the macro base station are allocated through a scheduler at the macro base station.

Unfortunately, such conventional methods for controlling interference have some shortcomings. For instance, since interference in user equipment due to a femto base station may occur irregularly, it is difficult to react to interference at a suitable time. Additionally, because it may be unclear which femto base station influences an user equipment by interference, it is difficult to properly allocate resources to a femto base station and a macro base station.

BRIEF SUMMARY OF THE INVENTION

Accordingly, the present invention is addresses the above-mentioned problems and/or disadvantages and provides at least the advantages described below.

One aspect of the present invention is to provide a method for controlling interference unfavorably occurring due to different types of base stations.

Another aspect of the present invention is to provide a communication system for executing the above interference control method.

According to one aspect of the present invention, a method for controlling interference in a communication system having a femto base station and a resource allocation control unit is provided. The method includes: at the femto base station, sending a Femtocell Interference Indication (FII) report to the resource allocation control unit when a user equipment is connected to the femto base station, the FII report containing a request for the allocation of resources to avoid interference; and at the resource allocation control unit, establishing a Femto Interference Coordination (FIC) zone according to the received FII report, the FIC zone indicating a particular region used to define resources allocated to the femto base station.

According to another aspect of the present invention, a communication system for controlling interference is provided. The system includes: a femto base station configured to send a Femtocell Interference Indication (FII) report when a user equipment is connected to the femto base station, the FII report containing a request for the allocation of resources to avoid interference; and a resource allocation control unit configured to receive the FII report from the femto base station and to establish a Femto Interference Coordination (FIC) zone according to the received FII report, the FIC zone indicating a particular region used to define resources allocated to the femto base station.

BRIEF DESCRIPTION OF THE DRAWINGS

Other aspects, advantages, and salient features of the invention will become apparent to those skilled in the art from the following detailed description, which, taken in conjunction with the accompanying drawings, discloses embodiments of the invention.

FIG. 8 is a flow diagram illustrating a method for controlling interference in a communication system composed of a macro base station and a femto base station in accordance with another embodiment of the present invention.

DETAILED DESCRIPTION OF THE INVENTION

Preferred, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

Among terms set forth herein, a self-organizing network server (hereinafter will be referred to as an SON server) refers to a network element, which registers each individual base station accessing a network and also has functions such as cell optimization and cell operation. An SON server may be also referred to as an Operation and Maintenance (O&M) server. Particularly, an SON server may deliver information between a femto base station and a macro base station, and function as a resource allocation control unit.

Figure 1:
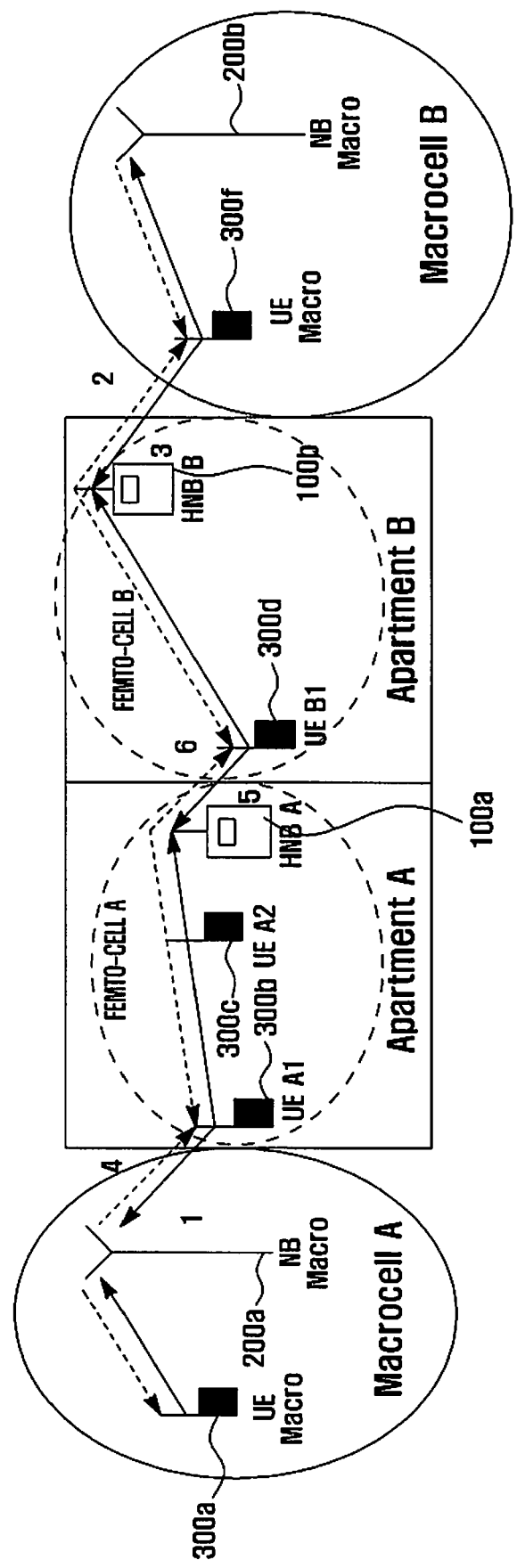
FIG. 1 is a schematic view illustrating a conventional communication environment in which interference occurs between a macro base station and a femto base station.
Figure 2:
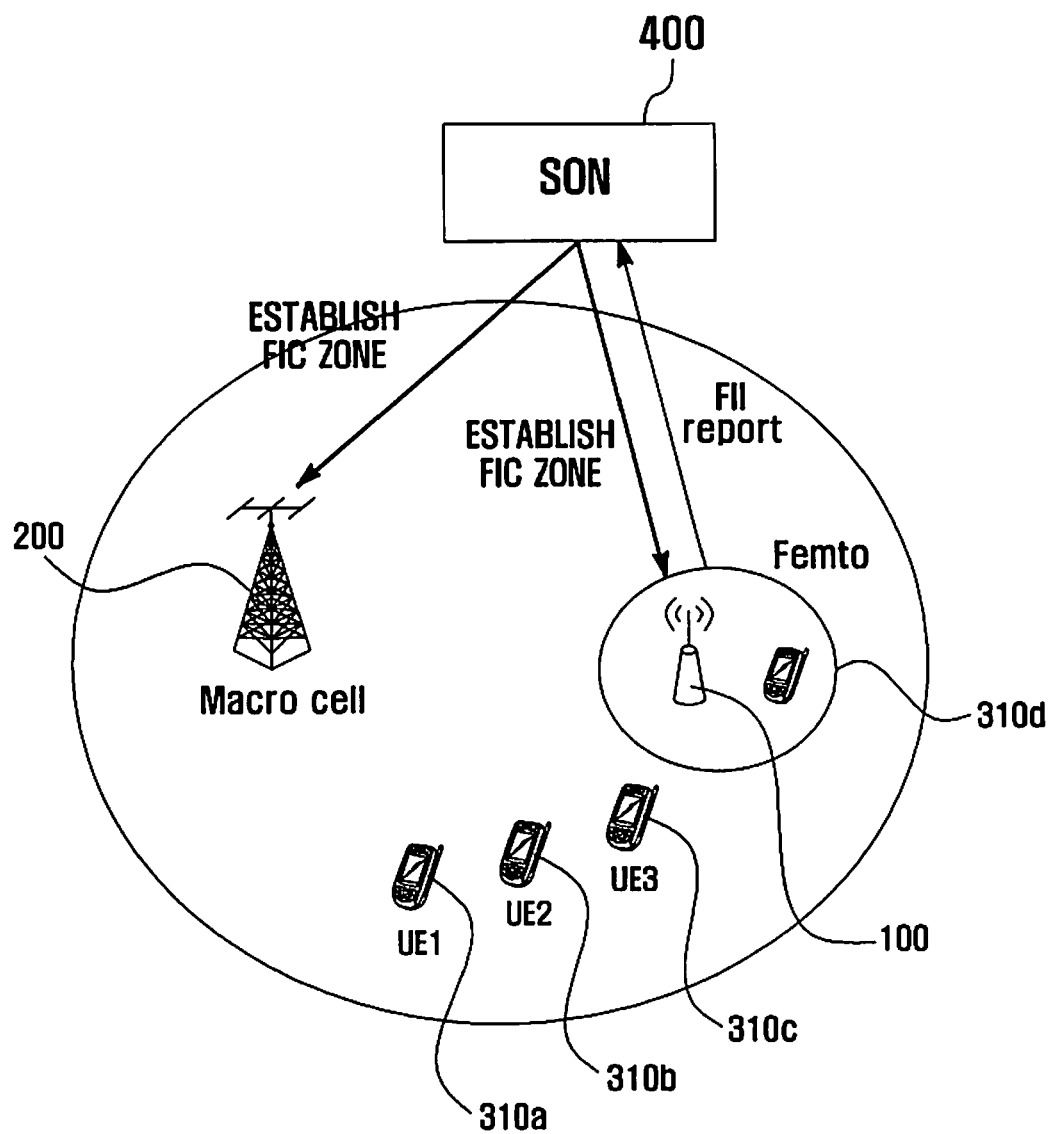
FIG. 2 is a schematic view illustrating a communication system which is composed of a macro base station, a femto base station, and a Self-Organizing Network (SON) server in order to control interference in accordance with an embodiment of the present invention.

FIG. 2 is a schematic view illustrating a communication system which is composed of a macro base station, a femto base station, and an SON server in order to control interference in accordance with an embodiment of the present invention.

Referring to FIG. 2, the macro base station 200 and the femto base station 100 may transmit and receive a signal through the SON server 400. Particularly, the femto base station 100 sends a Femtocell Interference Indication (FII) report to the SON server 400 when a connection is established with any user equipment 310d entering into its own femtocell coverage area. The FII report contains information used to notify neighboring user equipment or the macro base station 200 that interference may occur due to the femto base station 100. The FII report may be formed as follows:

1) Features: Information for requesting the resource allocation of a particular region to avoid interference since such interference may be invoked in neighboring user equipments or the macro base station due to Tx power-on of the femto base station 100 connected with any user equipment;

2) Transmission Target: The SON server 400 or the macro base station 200 controlling a macro cell where the femto base station 100 is located;

3) Transmission Condition: Applies where the Tx power of the femto base station 100 is turned on;

4) Transmission Cycle: Event driven or periodic; and

5) Containing Information: Femtocell ID, Femtocell group ID, Tx/Rx power-on information, location information, power masking information, etc.

Here, power masking information refers to information about a frequency band required for executing a communication function at each of the user equipments located near a femtocell.

The SON server 400 receiving the FII report establishes a Femto Interference Coordination (FIC) zone. Here, the FIC zone refers to a particular region used to define resources allocated respectively to the femto base station 100 and the macro base station 200. The FIC zone will be described in detail referring to FIG. 3.

After establishing the FIC zone, the SON server 400 sends information about the FIC zone to the macro base station 200 and the femto base station 100. At this time, the SON server 400 allocates a frequency band (also referred to as a femto band) to the femtocell.

The macro base station 200 can allocate downlink/uplink resources to the user equipment by using the FIC zone. Specifically, the macro base station 200 performs scheduling to allocate normal resources to certain user equipments 310a and 310b located in its own macro cell coverage area. However, with respect to a specific user equipment 310c which is located in the macro cell and also is near the femtocell, the macro base station 200 performs femtocell interference mitigation scheduling by referring resources in the FIC zone. That is, the macro base station 200 allocates specific one of remaining resources except resources in the FIC zone to user equipment 310c adjacent to the femtocell. Such resource allocation makes it possible to prevent an overlap between a resource allocated to a user equipment in the femtocell coverage area and a resource allocated to a user equipment adjacent to the femtocell. Accordingly, a downlink or uplink between such user equipment 310c and the macro base station 200 may not be affected by interference due to the femto base station 100.

The FIC zone, which is created by the SON server 400 in order to minimize interference caused by the activation of the femto base station 100, may be removed when the Tx power of the femto base station 100 is turned off. Therefore, the femto base station 100 should notify the SON server 400 that the Tx power is turned off. A related process will be described below in relation to in FIG. 4.

Figure 3:
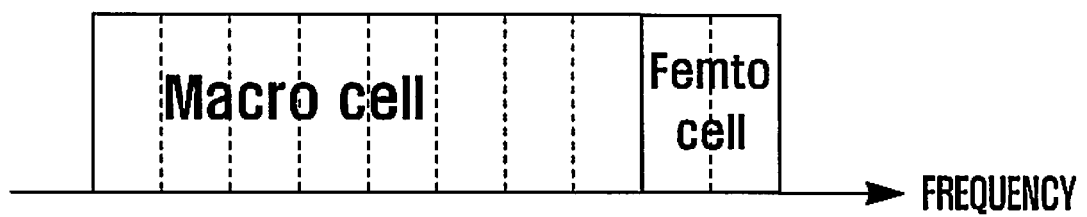
FIG. 3 illustrates an example of an FIC zone in accordance with an embodiment of the present invention.

FIG. 3 illustrates an example of an FIC zone in accordance with an embodiment of the present invention.

Referring to FIG. 3, the FIC zone indicates resource regions allocated to the femto base station 100 by a resource allocation control unit, such as the macro base station or the SON server, which controls the allocation of resources. If resources which may be allocated to the macro cell and the femtocell include ten regions, for example, two of them may be allocated to the FIC zone as shown. Also, the FIC zone may be varied depending on the FII report received from the femto base station 100 with Tx power-on. In other words, the FIC zone may be established in a different configuration depending on the FII report and power masking information delivered at the request of the macro base station 200 or the SON server 400. For instance, if a resource is a frequency band and a frequency bandwidth allocable to the macro cell and the femtocell is 500 MHz, and power masking information tells that user equipment has a frequency bandwidth of 200 MHz, then a frequency band of 200 MHz may be allocated to the FIC zone while leaving the others (i.e., 300 MHz) for the macro base station.

Figure 4:
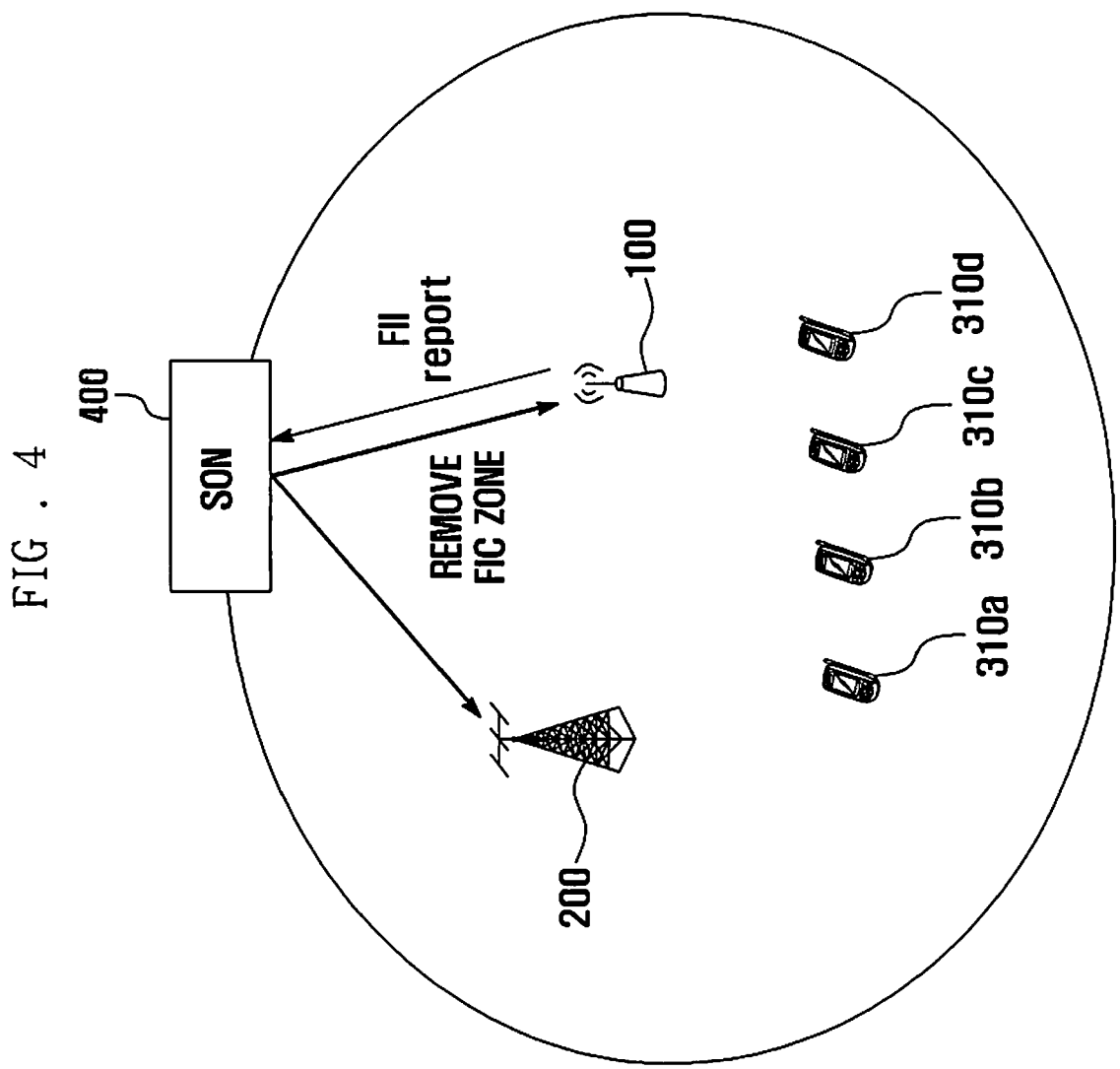
FIG. 4 is a schematic view illustrating a communication system which is composed of a macro base station, a femto base station, and an SON server in order to remove an FIC zone in accordance with an embodiment of the present invention.

FIG. 4 is a schematic view illustrating a communication system which is composed of a macro base station, a femto base station, and an SON server in order to remove an FIC zone in accordance with an embodiment of the present invention.

Referring to FIG. 4, information between the macro base station 200 and the femto base station 100 may be transmitted and received through the SON server 400. Particularly, the femto base station 100 turns off Tx power when user equipment 310d is released from a connection through handover to another cell. Here, the femto base station 100 sends a Femtocell Interference Free (FIF) report to the SON server 400 just before Tx power is turned off. The FIF report contains information used to notify the neighboring macro base station 200 that interference due to the femto base station 100 may not occur anymore. The FIF report may be formed as follows.

1) Features: Information for requesting the resource recovery of an allocated region since no interference may be invoked in neighboring user equipment or the macro base station due to Tx power-off of the femto base station 100 which has been disconnected with user equipment;

2) Transmission Target: The SON server 400 or the macro base station 200 controlling a macro cell where the femto base station 100 is located;

3) Transmission Condition: Applies where the Tx power of the femto base station 100 is turned off;

4) Transmission Cycle: Event driven or periodic; and

5) Containing Information: Femtocell ID, Femtocell group ID, Tx/Rx power on information, location information, power masking information, etc.

The SON server 400 receives the FIF report removes the FIC zone. Thereafter, the SON server 400 sends information about the removal of the FIC zone to the macro base station 200.

The SON server 400 may establish or remove the FIC zone by using the FII report or the FIF report delivered whenever the Tx power of the femto base station 100 is turned on or off. Additionally, the macro base station 200 may flexibly allocate resources to a user equipment by using the FIC zone. Since resources allocated to the user equipment are flexibly varied, unfavorable interference due to the femto base station 100 may be minimized.

Now, an interference control method will be described.

Figure 5:
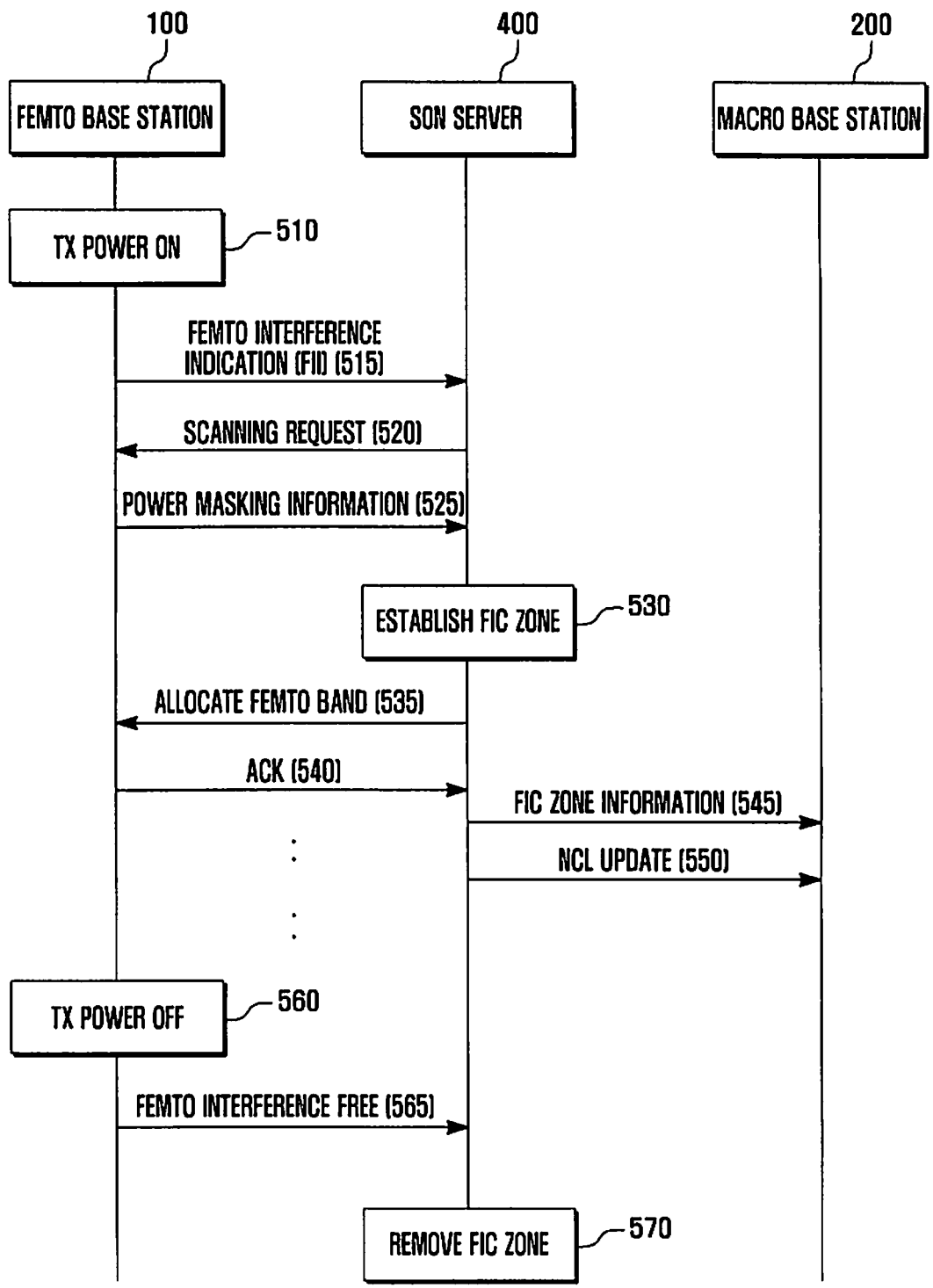
FIG. 5 is a flow diagram illustrating a method for controlling interference in a communication system composed of a macro base station, a femto base station, and an SON server in accordance with an embodiment of the present invention.

FIG. 5 is a flow diagram illustrating a method for controlling interference in a communication system composed of a macro base station, a femto base station, and an SON server in accordance with an embodiment of the present invention.

Referring to FIG. 5, when the Tx power is turned on in step 510, the femto base station 100 sends the FII report to the SON server 400 in step 515. Here, the Tx power of the femto base station 100 may be turned on when a user equipment is connected to the femto base station 100 through handover. As discussed above, the FII report contains information for requesting the resource allocation of a particular region since Tx power-on of the femto base station 100 may invoke interference in neighboring user equipments or the macro base station.

The SON server 400 receiving the FII report sends a scanning request signal to the femto base station 100 in step 520. The scanning request signal is used to estimate communication environments surrounding the femto base station 100. After receiving the scanning request signal, the femto base station 100 checks the strength of a frequency band that the neighboring user equipment uses. Then the femto base station 100 sends power masking information to the SON server 400 in step 525. The power masking information corresponds to the strength of a frequency band. If necessary, the power masking information may be contained in the FII report sent in step 515. In this case, steps 520 and 525 may be omitted.

Next, the SON server 400 establishes the FIC zone, depending on the power masking information (step 530). As discussed above, the FIC zone indicates a particular region defined to minimize interference, which occurs in a downlink or uplink between user equipment and the macro base station 200 due to the femto base station 100.

Thereafter, the SON server 400 allocates a frequency band (also referred to as a femto band) to the femto base station 100 by using the FIC zone in step 535. Then the femto base station 100 checks the allocated femto band and sends an acknowledgement (ACK) signal to the SON server 400 in step 540.

Also, the SON server 400 sends information about the FIC zone to the macro base station 200 in step 545. Then, by using the received information about the FIC zone, the macro base station 200 may allocate resources to the user equipment connected thereto. At this time, the macro base station 200 may perform resource allocation to the user equipment adjacent to the femtocell by using remaining resources except for the resources allocated to the FIC zone. Also, the SON server 400 sends an updated neighbor cell list (NCL) to the macro base station 200 in step 550.

On the other hand, if the user equipment connected to the femto base station 100 is disconnected through handover to another cell, the femto base station 100 turns off the Tx power in step 560. Then the femto base station 100 sends the FIF report to the SON server 400 in step 565. As discussed above, the FIF report contains information notifying the SON server that the femto base station 100 is no longer transmitting.

After receiving the FIF report, the SON server 400 removes the FIC zone in step 570. Thereafter, although not illustrated, the SON server 400 sends information about the removal of the FIC zone to the macro base station 200. Then the macro base station 200 may cancel the use of the FIC zone established for the user equipment adjacent to the femtocell. Also, the SON server 400 sends an updated NCL to the macro base station 200 so that the macro base station 200 may update information about neighbor base stations.

Described previously are a method for controlling interference through the SON server 400, and a communication system for executing such a method. Now, another method and communication system for interference control based on direct communication between the femto base station 100 and the macro base station 200 will be described referring to FIGS. 6 to 9.

Figure 6:
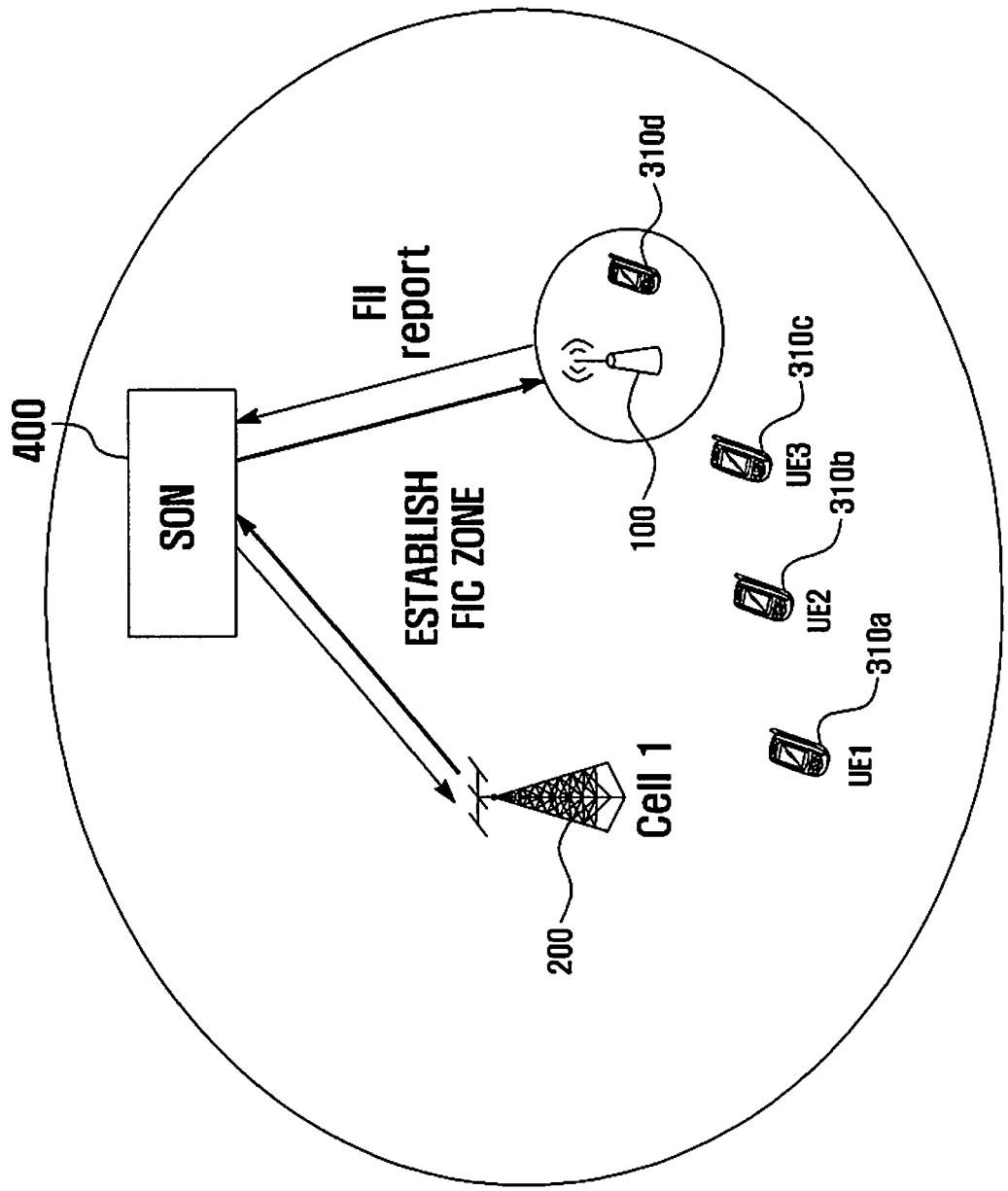
FIG. 6 is a schematic view illustrating a communication system which is composed of a macro base station and a femto base station in order to control interference in accordance with another embodiment of the present invention.

FIG. 6 is a schematic view illustrating a communication system which is composed of a macro base station and a femto base station in order to control interference in accordance with another embodiment of the present invention.

Referring to FIG. 6, the macro base station 200 and the femto base station 100 may transmit and receive information through the SON server 400. Particularly, the femto base station 100 sends the FII report to the macro base station 200 through the SON server 400 when a connection is established to any user equipment 310d entering into its own femtocell coverage area. As discussed above, the FII report contains information notifying neighboring user equipments or the macro base station 200 that interference may occur due to the femto base station 100. Since the FII report has been already described in FIG. 3, the repetition of the same will be avoided hereinafter. Meanwhile, the femto base station 100 does not always send the FII report to the macro base station 200 through the SON server 400. If any X2 interface is established between the femto base station 100 and the macro base station 200, the femto base station 100 may directly transmit and receive information to and from the macro base station 200 without passing through the SON server 400. Here, X2 interface is the interface to execute communication between base stations in LTE (Long Term Evolution) system or 3GPP (3$^{rd}$ Generation Partnership Project).

The macro base station 200 receiving the FII report establishes the FIC zone. Also, the macro base station 200 allocates a frequency band (also referred to as a femto band) to the femto base station 100 by using the FIC zone. Then the macro base station 200 sends information about an allocated femto band to the femto base station 100 through the SON server 400. At the same time, the macro base station 200 allocates resources to a user equipment located in its own cell. Meanwhile, except for resources allocated to the FIC zone, the macro base station 200 allocates remaining resources to user equipments adjacent to the femtocell.

That is, the femto base station 100 sends, in advance, the FII report to the macro base station 200, and this FII report includes information about a dynamically varied interference state of the femtocell. Therefore, the macro base station 200 will be notified of interference which occurs due to the femto base station 100, and can cope with such interference.

Additionally, the FIC zone, which is created by the macro base station 200 in order to minimize interference caused by the activation of the femto base station 100 may be removed when the Tx power of the femto base station 100 is turned off. Therefore, the femto base station 100 should notify the macro base station 200 that the Tx power is turned off. A related process will be described in FIG. 7.

Figure 7:
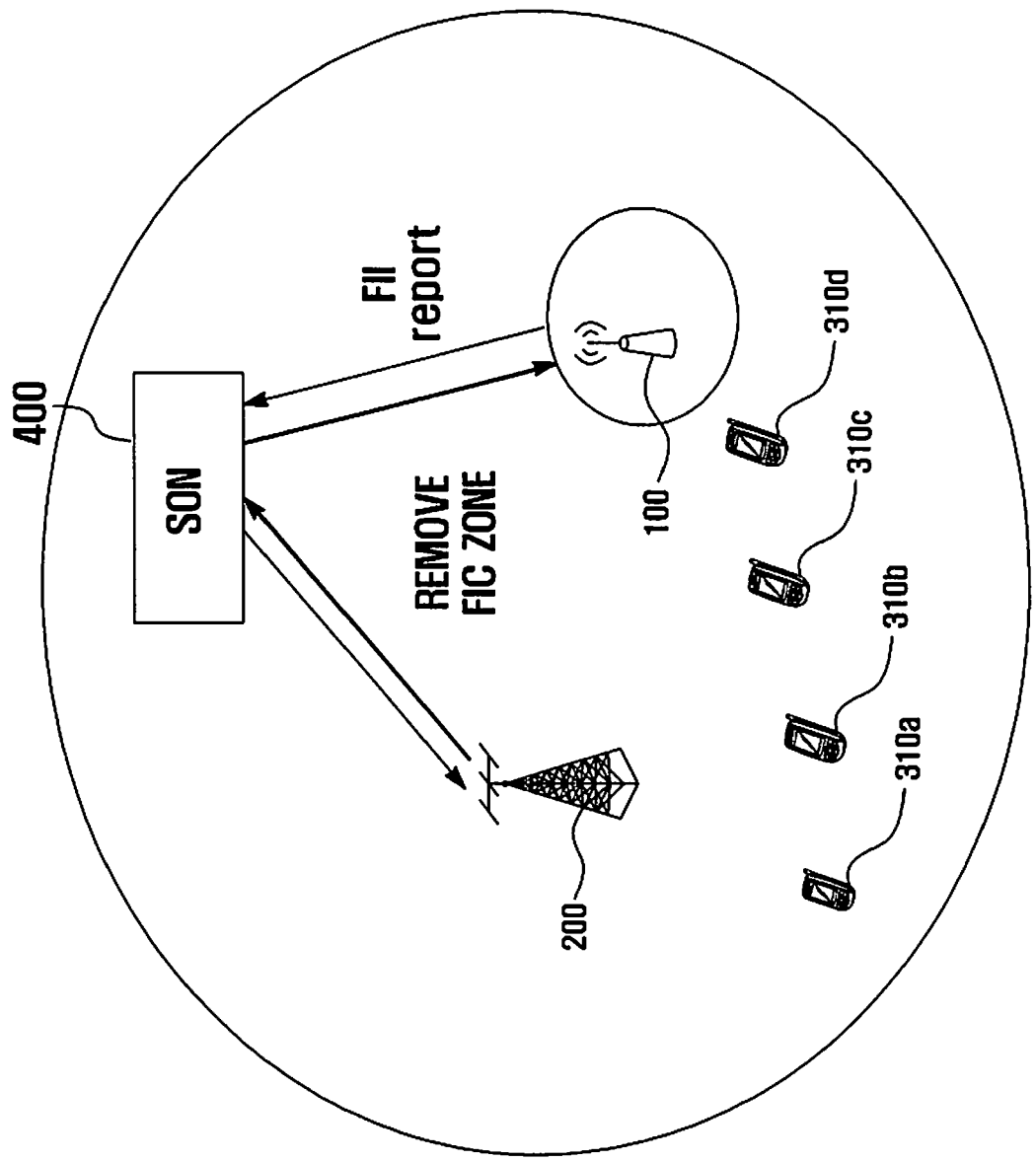
FIG. 7 is a schematic view illustrating a communication system which is composed of a macro base station and a femto base station in order to remove an FIC zone in accordance with another embodiment of the present invention.

FIG. 7 is a schematic view illustrating a communication system which is composed of a macro base station and a femto base station in order to remove an FIC zone in accordance with another embodiment of the present invention.

Referring to FIG. 7, information between the macro base station 200 and the femto base station 100 may be transmitted and received through the SON server 400. Particularly, the femto base station 100 turns off Tx power when user equipment 310d is released from a connection through handover to another cell. Here, the femto base station 100 sends the FIF report to the macro base station 200 through the SON server 400 just before Tx power is turned off. As discussed above, the FIF report contains information used to notify the neighbor macro base station 200 that interference due to the femto base station 100 may not occur any more. Since the FIF report has been already described in FIG. 4, the repetition of the same will be avoided hereinafter.

The macro base station 200 receiving the FIF report removes the FIC zone. Thereafter, the macro base station 200 updates the NCL indicating information about neighboring base stations.

The macro base station 200 may establish or remove the FIC zone by using the FII report or the FIF report delivered whenever the Tx power of the femto base station 100 is turned on or off. Additionally, the macro base station 200 may flexibly allocate resources to a user equipment by using the FIC zone. Since resources allocated to the user equipment are flexibly varied, unfavorable interference due to the femto base station 100 may be minimized.

Now, an interference control method will be described.

FIG. 8 is a flow diagram illustrating a method for controlling interference in a communication system composed of a macro base station and a femto base station in accordance with another embodiment of the present invention.

Referring to FIG. 8, when the Tx power is turned on in step 810, the femto base station 100 sends the FII report to the macro base station 200 in step 815. Here, the Tx power of the femto base station 100 may be turned on when a user equipment is connected with the femto base station through handover. As discussed above, the FII report contains information for requesting the resource allocation of a particular region since the Tx power-on of the femto base station 100 may invoke interference in neighboring user equipments or the macro base station. Although not illustrated, the femto base station 100 may send the FII report to the macro base station 200 through the SON server. Alternatively, if a communication channel such as an X2 interface is established between the femto base station 100 and the macro base station 200, the femto base station 100 may directly send the FII report to the macro base station 200 without passing through the SON server, such that the macro base station 200 functions as a resource allocation control unit.

The macro base station 200 receiving the FII report sends a scanning request signal to the femto base station 100 in step 820. The scanning request signal is used to estimate communication environments surrounding the femto base station 100. After receiving the scanning request signal, the femto base station 100 checks the strength of a frequency band that the neighboring user equipment uses. Then the femto base station 100 sends power masking information corresponding to the strength of a frequency band to the macro base station 200 in step 825. If necessary, the power masking information may be contained in the FII report sent in the aforesaid step 815. In this case, steps 820 and 825 may be omitted.

Next, the macro base station 200 establishes the FIC zone, depending on the power masking information in step 830. As discussed above, the FIC zone indicates a particular region defined to minimize interference, which occurs in a downlink or uplink between a user equipment and the macro base station 200 due to the femto base station 100.

Thereafter, the macro base station 200 allocates a frequency band (also referred to as a femto band) to the femto base station 100 by using the FIC zone in step 835. Then the femto base station 100 checks the allocated femto band and sends an acknowledgement (ACK) signal to the macro base station 200 in step 840.

After receiving the acknowledgement signal, the macro base station 200 updates the NCL indicating information about neighboring base stations in step 850. Also, in this step, the macro base station 200 allocates resources to the user equipment connected thereto. At this time, the macro base station 200 performs resource allocation to the user equipments adjacent to the femtocell by using remaining resources except for resources allocated to the FIC zone. Although not illustrated, the macro base station 200 sends an updated NCL to any external server such as the SON server 400. Then, by using the received NCL, the SON server 400 updates information about neighboring base stations.

On the other hand, if a user equipment connected with the femto base station 100 is disconnected through handover to another cell, the femto base station 100 turns off the Tx power in step 860. Then the femto base station 100 sends the FIF report to the macro base station 200 in step 865. As discussed above, the FIF report contains information notifying the macro base station 200 that the femto base station 100 is not transmitting.

After receiving the FIF report, the macro base station 200 removes the FIC zone and then updates again the NCL indicating information about neighboring base stations in step 870.

Heretofore, methods for controlling interference caused by the femto base station 100 have been described. Given below is a summarized description of the above-discussed methods.

The femto base station 100 sends the FII report to the SON server 400 or the macro base station 200 when the Tx power is turned on. Also, the femto base station 100 sends the FIF report to the SON server 400 or the macro base station 200 when the Tx power is turned off. Thereby, the SON server 400 or the macro base station 200 can minimize unfavorable interference caused by the activation of the femto base station 100. Particularly, depending on the FII report or the FIF report sent from the femto base station 100, the SON server 400 or the macro base station 200 can determine when the femto base station 100 may be interfering with the macro base station 200.

Additionally, depending on the power masking information, the SON server 400 or the macro base station 200 can estimate surrounding communication environments sensitive to interference caused by the femto base station 100. Also, by using the power masking information, the SON server 400 or the macro base station 200 can establish the FIC zone to minimize interference occurring due to the femto base station 100.

Further, although the user equipment may have no GPS-related information, the SON server 400 or the macro base station 200 can minimize interference through the FIC zone which is varied according to Tx power on/off of the femto base station 100.

As fully discussed hereinbefore, the present invention makes it possible to allocate a resource, in advance, to the femto base station since the SON server or the macro base station already knows a time when interference occurs due to the femto base station. Such early allocation of a resource to the femto base station may allow timely control of interference caused by the femto base station. Therefore, the SON server or the macro base station can efficiently manage resources allocated to user equipments and thereby minimize interference caused by the femto base station.

While this invention has been particularly shown and described with reference to embodiments thereof, it will be understood by those skilled in the art that various changes in form and details may be made therein without departing from the spirit and scope of the invention as defined by the appended claims.

What is claimed is:

1. A method for controlling interference in a communication system having a femto base station and a resource allocation control unit, the method comprising:
    at the femto base station, sending a femtocell interference indication (FII) report to the resource allocation control unit when at least one user equipment is connected to the femto base station, the FII report containing a request for the allocation of resources to avoid interference; and
    at the resource allocation control unit, establishing a femto interference coordination (FIC) zone according to the received FII report, the FIC zone indicating a particular region used to define resources allocated to the femto base station.

2. The method of claim 1, further comprising:
    if the resource allocation control unit is a macro base station, at the femto base station, sending a femtocell interference free (FIF) report to the macro base station when the user equipment is disconnected from the femto base station, the FIF report containing a request for the recovery of the resources allocated to avoid interference; and
    at the macro base station, removing the FIC zone according to the received FIF report.

3. The method of claim 1, wherein the FII report further contains power masking information about a frequency band required for executing a communication function at each of the user equipments located adjacent to the femto base station.

4. The method of claim 1, further comprising:
    at the femto base station, turning on the power of a transmission terminal when the user equipment is connected to the femto base station.

5. The method of claim 1, wherein if the resource allocation control unit is a self-organizing network (SON) server, the SON server establishes the FIC zone according to the received FII report, the FIC report indicating a particular region used to define resources allocated respectively to the femto base station and a macro base station controlling a cell of the femto base station, and wherein the SON server sends information about the FIC zone to the femto base station and the macro base station.

6. The method of claim 5, further comprising:
    at the femto base station, sending a femtocell interference free (FIF) report to the SON server when the user equipment is disconnected from the femto base station, the FIF report containing a request for the recovery of the resources allocated to avoid interference; and
    at the SON server, removing the FIC zone according to the received FIF report and sending information about the removal of the FIC zone to the macro base station.

7. A communication system for controlling interference, the system comprising:
    a femto base station configured to send a femtocell interference indication (FII) report when at least one user equipment is connected to the femto base station, the FII report containing a request for the allocation of resources to avoid interference; and
    a resource allocation control unit configured to receive the FII report from the femto base station and to establish a femto interference coordination (FIC) zone according to the received FII report, the FIC zone indicating a particular region used to define resources allocated to the femto base station.

8. The system of claim 7, wherein the resource allocation control unit is a macro base station, and wherein the femto base station is further configured to send a femtocell interference free (FIF) report to the macro base station when the user equipment is disconnected from the femto base station, the FIF report containing a request for the recovery of the resources allocated to avoid interference.

9. The system of claim 8, wherein the macro base station is further configured to remove the FIC zone according to the received FIF report.

10. The system of claim 7, wherein the resource allocation control unit is a self-organizing network (SON) server, and wherein the SON server is configured to establish the FIC zone according to the received FII report, the FIC report indicating a particular region used to define resources allocated respectively to the femto base station and a macro base station controlling a cell of the femto base station, and wherein the SON server is further configured to send information about the FIC zone to the femto base station and the macro base station.

11. The system of claim 10, wherein the femto base station is further configured to send a femtocell interference free (FIF) report to the SON server when the user equipment is disconnected to the femto base station, the FIF report containing a request for the recovery of the resources allocated to avoid interference.

12. The system of claim 11, wherein the SON server is further configured to remove the FIC zone according to the received FIF report and to send information about the removal of the FIC zone to the macro base station.

* * * * *